United States Patent [19]

Kirkpatrick et al.

[11] 4,056,399

[45] Nov. 1, 1977

[54] ACID AND HEAT RESISTANT MORTARS FOR CELLULAR GLASS BODIES

[75] Inventors: John Kirkpatrick, Trafford; John Kijowski, Bradford, both of Pa.

[73] Assignee: Pittsburgh Corning Corporation, Pittsburgh, Pa.

[21] Appl. No.: 683,754

[22] Filed: May 6, 1976

[51] Int. Cl.$^2$ .............................................. C04B 35/14
[52] U.S. Cl. ...................................................... 106/69
[58] Field of Search .......................................... 106/69

[56] References Cited

U.S. PATENT DOCUMENTS 3,957,520  5/1976  Linton .................................... 106/69

*Primary Examiner*—J. Poer
*Attorney, Agent, or Firm*—Stanley J. Price, Jr.; John M. Adams

[57] ABSTRACT

A mortar composition for use in bonding cellular glass bodies includes a mixture, as expressed by percentage weight, of finely powdered reactive glass, such as cellular glass powder, in the range of between about 26 to 48 percent, inert aggregate filler in the range of between about 26 and 61 percent, and a silica sol binder in the range of between about 13 and 26 percent. The cellular glass powder has substantially the same composition as the cellular glass bodies being bonded. The inert aggregate filler preferably comprises round grained silica sand having a particle size wherein substantially all of the particles pass through a U.S. Standard #35 Screen and coarse cellular glass particles wherein substantially all the particles pass through a U.S. Standard #35 Screen. The ratio of finely powdered reactive glass to sol binder is maintained between about 1.8 to 1 and 2.0 to 1. By controlling the particle size of the finely ground cellular glass powder, the sol demand is substantially minimized. Furthermore, the finely ground cellular glass powder is operative as a setting agent in place of conventionally known setting agents.

13 Claims, No Drawings

ACID AND HEAT RESISTANT MORTARS FOR CELLULAR GLASS BODIES

BACKGROUND OF THE INVENTION

1. Field of the Invention

This invention relates to the bonding of cellular glass bodies and more particularly to a bonded cellular glass body system and mortar therefor wherein the mortar includes a substantial portion of a glass powder having a composition substantially the same as that of the cellular glass being bonded.

2. Description of the Prior Art

Acid-resistant mortars and coating for insulating systems are well known in the art. Such mortars are generally employed in bonding insulating systems which are exposed to cyclic acidic environments. For example, in an industrial smoke stack, as in a coal-burning power plant, a brick lining has been employed in which the brick lining was bonded with an acid-resistant silicate containing mortar. The mortar and brick were acid resistant in order to avoid damage due principally to the presence of sulfuric acid formed by hydrolysis of sulfur oxides in the stack gases.

The early acid-resistant mortars comprised wet mixtures of silica sand and sodium silicate which were "cured" by evaporation and exposure to acid, either as a wash or while in service. Later, setting agents were developed which were added to the silicate powders. Commonly used silica sol setting agents are sodium silicate glass (ca 3.2 ratio), sodium silicofluoride ($Na_2SiF_6$), aluminum phosphate ($Al_3(PO_3)_3$) and the like. However, utilizing setting agents in silica sol based mortars introduces a foreign and costly compound. Further, the presence of the setting agent may render the silica sol based mortar unsuitable for high temperature service with cellular glass insulation. In addition, the advantage achieved by the use of the silica sol setting agent of rapidly developing mortar strength to permit continuous laying of brick is offset by a substantial reduction in the pot life of the mortar. It is known that trace amounts of moisture in packages of silica sol based mortars containing a sodium silicate glass setting agent initiates first a dissolving stage and ultimately a drop in pot life from about one half hour to about ten minutes in a matter of a few months as a consequence of the uncontrolled hydration of sodium silicate.

Not only are silica sol base mortars containing setting agents costly, the setting agent raises the pH to the range within which gelation occurs within unreasonable times. Nevertheless, the foregoing mortars were developed to bond dense acid resistant brick systems. Brick densities were in the order of 140 pounds per cubic foot which insured sufficient pressure on the mortar joint to promote a good bond. Moreover, the linear coefficients of thermal expansion of brick and prior art mortars were comparable (ca. $7-9 \times 10^{-6}$ in/in/° F.) so as to minimize spalling and thermal shock failures.

More recently, however, superior insulation compositions have been developed, particularly in the area of cellular glass type compositions. For example, cellular borosilicate glass compositions in the form of blocks or slabs have been developed which are acid resistant and which have excellent insulating properties. The cellular silicates, however, differ substantially from bricks in both physical and thermal characteristics. The cellular borosilicate glasses have a density of only about 9 – 15 pounds per cubic foot and while being an important advantage from one standpoint, that density does not provide sufficient joint pressure to provide a good bond with prior art mortars. A cellular borosilicate glass composition may typically have a linear coefficient of thermal expansion of about $1.7 \times 10^{-6}$ in/in/° F., far lower than that of bricks or prior art mortars.

As stated above, it has been the conventional practice to control the gelation or setting of silica sol based mortars by the addition of small amounts of a setting agent to the mortar composition, as disclosed in U.S. Pat. Nos. 2,995,453 and 3,024,125. In addition, the particle size distribution of the glass powder, i.e. the specific surface of the fines component, and the relative proportions of the fines to liquid sol must also be controlled to achieve optimum gelation and hardening within a reasonable time. Moreover, it is highly desirable to minimize the sol demand in order to minimize the mortar cost in which the sol component constitutes the most expensive element of the mortar composition and to also lessen mud cracking. It follows that a minimum sol content provides a minimum of fines; however, too few fines gives a sol based mortar that is dry and difficult to work. The addition of an excess of sol, however, leads to "flooding" or "weeping"; while an excess of fines requires an unnecessary additional expenditure of sol which then yields a mortar prone to mud cracking.

Accordingly, there is need for acid-resistant compositions useful in bonding cellular glass bodies in which the composition yields a minimum of sol demand required to yield a trowelable mortar. In addition, there is need for a silica sol based mortar having a composition comparable to that of the cellular glass bodies being bonded and capable of reacting with selected silica sols to yield a gel and subsequently harden into a durable, cementitious mass having good thermal shock characteristics and serviceable under elevated temperatures. Additionally, there is need for a silica sol based mortar composition in which a minimum sol content is provided in the desired ratio with the fines to yield a trowelable mortar that hardens within a reasonable time. Further, there is need for an acid-resistant mortar composition that excludes setting agents and has a constant working life in comparison with known silica sol mortars containing setting agents.

SUMMARY OF THE INVENTION

In accordance with the present invention, there is provided an acid-resistant mortar cmoposition for bonding cellular glass bodies wherein the mortar composition comprises a mixture expressed in percentage by weight of finely powdered reactive glass in the range of between about 26 and 48 percent. The powdered reactive glass has substantially the same composition as the cellular glass bodies to be bonded. The finely powdered reactive glass is admixed with an inert aggregate filler in the range of between about 26 and 61 percent. The finely powdered reactive glass and inert aggregate filler are admixed with a colloidal silica solution or silica sol binder in the range of between about 13 and 26 percent.

The preferred mortar composition in accordance with the present invention comprises a finely powdered reactive glass selected from the group consisting of finely ground cellular glass powder, finely ground container glass powder, and finely ground glass cullet powder. The ratio of finely ground glass powder to sol binder is maintained between about 1.8 to 1 and 2.0 to 1. A glass powder to liquid sol ratio of this amount provides the minimum sol content to yield a trowelable mix that hardens within a reasonable time. Prefereably, the finely powdered reactive glass comprises finely comminuted borosilicate cellular glass having a particle in which substantially all of the particles pass through a U.S. Standard #325 Screen. The inert aggregate filler has relatively coarse particle characteristics in comparison with the finely ground glass powder and substantially all the particles of the inert aggregate filler pass through a U.S. Standard #20 Screen.

Preferably, the inert aggregate filler comprises round grained Ottawa silica sand and occupies a major solid volume of the mortar. The inert aggregate filler possesses thermal properties comparable to that of the cellular glass bodies being bonded. Coarsely ground cellular glass particles of similar size distribution as the silica sand may be substituted therefor as the inert aggregate filler. Also, betaspondumene or fused silica may be used in place of silica sand as the inert aggregate filler.

In the most preferred mortar composition in accordance with the present invention, for 100 parts of combined finely powdered reactive glass and inert aggregate filler, the glass powder comprises about 36 parts by weight and the inert aggregate filler the remaining 64 parts by weight. Preferably, the inert aggregate filler comprises, based upon 100 parts combined aggregate filler and finely powdered reactive glass, coarse cellular glass particles in the amount of 8 parts by weight wherein substantially all of the particles pass through a U.S. Standard #35 Screen and round grained silica glass in the amount of 56 parts by weight wherein substantially all of the particles pass through a U.S. Standard #35 Screen. Preferably, the silica sol binder is present in an amount of about 20 parts by weight based upon 100 parts combined finely powdered cellular glass and inert aggregate filler.

In controlling the particle size of the finely ground powder and inert aggregate filler, the silica sol binder demand is minimized. Furthermore, by controlling the percentage amounts and particle size of the finely ground glass powder and inert aggregate filler, the particles in admixture with the silica sol binder act as a setting agent thereby eliminating the need for a setting agent, as utilized in conventionally known mortar compositions. The exclusion of a setting agent, such as sodium silicate glass, from the mortar composition extends the shelf life of the composition because hydration of sodium silicate reduces the shelf life of the mortar composition.

Cellular glass bodies bonded in an array by the mortar composition of the present invention possess excellent thermal insulation properties, good mechanical strength and are highly thermal-shock resistant. An array of cellular glass bodies bonded by the mortar of the present invention and permitted to dry at room temperatures possesses at least 89 percent of the flexural strength of monolithic or unbonded insulation block. Furthermore, bonded block exposed to cyclic heating from room temperature to an elevated temperature has demonstrated 80 percent of the flexural strength of monolithic block.

Accordingly, the principal object of the present invention is to provide acid and heat-resistant mortar for binding cellular glass bodies in which the mortar composition comprises finely ground reactive glass particles having a composition comparable to that of the glass bodies being bonded and a silica sol binder in which control of the particle size of the glass particles and control of the ratio of glass particles to the sol binder minimize the sol demand and eliminate the need for a conventional setting agent.

Another object of the present invention is to provide an acid and heat-resistant mortar for binding cellular glass bodies in which the mortar composition includes finely ground cellular glass particles that are utilized as a setting agent in place of conventionally known setting agents for silica sol based mortars.

A further object of the present invention is to provide an acid and heat-resistant mortar for binding cellular glass bodies in which the bonded cellular glass bodies possess at least 80 percent of the flexural strength of unbonded cellular glass bodies by a mortar composition having excellent thermal insulation properties and thermal shock resistance.

These and other objects of the present invention will be more completely disclosed and described in the following specification, the accompanying examples and the appended claims.

DESCRIPTION OF THE PREFERRED EMBODIMENT

Cellular glass bodies, such as cellular borosilicate glass bodies, generally comprise a cellular internal structure; and the glass compositions provide valuable insulating properties. The glass compositions are prepared by melting glass forming substances and molding them, as by extrusion, into a rod or tubular shape. The molded glass compositions are thereafter finally ground to provide a comminuted glass powder. The powder is admixed with a cellulating agent, usually comprising about 0.1–2 percent carbon and 0.5 percent antimony oxide. The admixture is thereafter heated to remelt temperatures so that the glass melts as the cellulating agent decomposes or gasifies to create a cellular mass. The cellular glass mass is thereafter annealed and allowed to cool to solidification in desired forms and finally cut into cellular glass bodies of particular required dimensions.

Typical cellular glass type compositions that demonstrate desirable thermal stability and insulating qualities include borosilicate cellular glass or cellular silicate. Such compositions may typically comprise, on a batch weight basis, about 7 – 20 percent $B_2O_3$, about 75 – 100 percent silica, and about 2 – 10 percent fluxing agent, such as $K_2O$. The compositions may additionally include some aluminum oxide ($Al_2O_3$). The compositions may be cellulated as hereinabove described to provide superior insulating compositions. A particularly useful cellular silica composition has been found to be that formed of a borosilicate glass having the composition 79.2% $SiO_2$; 18.4% $B_2O_3$; 2.4% $K_2O$. However, this and other borosilicate glass formed cellular bodies are not bondable with conventionally known mortars.

Mortar compositions in accordance with the present invention include a major portion of finely powdered reactive glass, such as a cellular glass powder, container glass powder, cullet glass powder or a mixture of a finely comminuted glass scrap having a composition substantially similar to that of the cellular glass being bonded. The reactive glass powders are prepared by grinding previously cellulated glass bodies, coarse glass cullet or cellular glass insulation scrap. It is most preferred that the glass powders comprise a major portion of very fine particles, e.g. about 99 percent passing through a U.S. Standard #325 Screen. As is the case with all mortars, the exact final compositions may vary somewhat with the particle size distribution of the powder but it has been found with finely ground reactive glass powders useful in the present invention that a major portion of the mortar, i.e. greater than 26 percent and, preferably, between about 26 to 48 percent by weight of the mortar composition, comprises finely comminuted reactive glass powder of the above described particle size. However, some experimentation may be necessary to optimize the mortar composition depending on the size and chemical character of the particular reactive glass powder employed.

Acid-resistant mortar compositions of the present invention include, in addition, a silica sol binder to set or gel the mortar. The silica sol binder may comprise between about 13 to 26 percent by weight of the mortar composition. Suitable silica sol compositions may comprise the commercially available colloidal silica solutions which typically include between about 30 – 50 percent by weight $SiO_2$ and usually about 40 percent. One suitable sol is the DuPont Chemical Company sol known as LUDOX HS — 40, which has the following properties:

| LUDOX HS - 40 | |
| --- | --- |
| Stabilizing Ion | Sodium |
| Particle size mu. | 13 – 14 |
| $SiO_2$ wt. % | 40 |
| pH | 9.7 |
| $Na_2O$ (titrated) | 0.43 |
| $SiO_2/Na_2$ ratio | 90 |

Mortar compositions for cellular glass compositions in the past have included a material hardening or setting agent to harden or cure the mortar after application to the cellular glass body, as disclosed and described in co-pending U.S. applications, Ser. No. 475,118 and Ser. No. 539,115, each entitled "Acid and Heat-Resistant Mortars For Cellular Glass Compositions And Products Therefrom". Known hardening agents include sodium silicofluoride and an acidic aluminum phosphate (cf. U.S. Pat. No. 3,445,257). It has been found in accordance with the present invention that the setting agent in certain silica sol mortar compositions constitutes a foreign and frequently costly element that may be considered superflous or redundant and renders the mortar composition unsuitable for high temperature service in bonding cellular glass bodies. Furthermore, the uncontrolled hydration which occurs with setting agents results in a reduced working life of the mortar composition.

To overcome the disadvantages inherent with conventionally employed setting agents, conventional setting agents have been deleted from the mortar composition of the present invention and finely ground reactive glasses are employed as a setting agent. Additional particulate material, such as finely ground cellular glass particles, when utilized as the setting agent, provides an improved silica sol based mortar composition having a more stable and longer shelf life than sol mortar compositions having conventional setting agents. The utilization of finely powdered reactive glasses as the setting agent, which has been found to react with sodium ion stabilized silica sol, yields, within a reasonable time and under conditions precluding solidification through drying, a gel that hardens to a durable, cementitious mass. The finely comminuted cellular glass particles contain alkali in an amount greater than about one percent, as is evidenced by the pH of water slurries of these reactive glasses where the alkaline range is greater than about 8.

The exact mechanism of the gelling and setting reaction is not known. However, it is observed that the reactive glasses are attacked sufficiently by the sol to lower the pH of the sol to the range in which gelation occurs within a reasonable time. It is known that the above identified sol is stable almost indefinitely as supplied at a pH of 9.7 but is found to gel within approximately 12 hours at a pH of approximately 8. The admixture of finely comminuted cellular glass in the mortar composition has been found to lower the pH of the mixture to approximately 8 and yield a gel with a solidification time of about 10 hours. Furthermore, by utilizing particles having a composition similar to the cellular glass bodies being bonded, the acid-resistant mortar composition has thermal-shock characteristics comparable with those of the cellular glass bodies.

By the addition of cellular glass particles to the mortar composition, an increased comminution results in a decrease in the amount of liquid sol required to yield a trowelable mortar. It has been found that, by controlling the particle size of the cellular glass particles to an average Fisher Subsieve Sizer diameter between about 3.5 to 5.5 micrometers in which 99 percent of the particles pass through a U.S. Standard #325 Screen, the sol demand is substantially minimized to preferably between about 13 and 26 percent by weight of the mortar composition.

In accordance with the present invention, the gelation and hardening of the mortar composition of the present invention is controlled by controlling the particle size distribution of the glass powder component. Preferably, the particles are maintained in the above described size range. A particle size greater than the preferred range results in a weak cementitious mass requiring a long gelation and hardening period with a less durable bonding. Gelation and hardening is also dependent on the relative proportions of particles to liquid sol. It has been found that the minimum gelation time to be essentially coincident with the minimum sol content required to yield a trowelable mix for cellular glass particles having a particle size within the above particle size. The preferred ratio of particles to liquid sol for a reasonable gelation and hardening of about 10 hours is in the range between about 1.8 to 1 and 2.0 to 1. An excess of sol lowering this ratio has been found to retard the gelation time. In addition to the above, the gelation reaction is retarded as the solids concentration of the sol is lowered. Preferably, the sol comprises 40 percent silica but may range between 30 to 50 percent silica with the higher concentrations providing the densent, strongest and least porous mortars.

A silica sol based mortar composition comprising a mixture of cellular glass powder and sol binder alone yields a mortar that is prone to mud cracking, lacking "body" and requiring a greater sol concentration than desirable. Accordingly, it has been found that the mortar composition of the present invention may advantageously include a large proportion of an aggregate filler having a particle size relatively coarse in comparison with that of the finely ground cellular glass powder described above. Preferably, an aggregate filler having a composition comprising granular siliceous compositions, typical of which are naturally occurring silica sands, are preferred. Typical of those sands are those known as round grained Ottawa silica sands having particles of a spherical and ellipsoidal shape. The preferred size distributions of the aggregate filler are as follows:

| SIZE DISTRIBUTION OF COARSE COMPONENTS Round Grain Sand | |
| --- | --- |
| 30 mesh | trace amounts |
| 40 mesh | 8 percent |
| 50 mesh | 41 percent |
| 70 mesh | 31 percent |
| 100 mesh | 14 percent |
| 140 mesh | 4 percent |
| 250 mesh | 1 percent |

Aggregate fillers of the above size distribution minimize both the grain surface area and the interstitial volume of the aggregate and thus minimize the sol requirement and promote a trowelable mortar with less "weeping" of the mortar. This is an advantageous feature because an inherent problem with sol-containing mortars is the short and/or unpredictable working time of such mortars. The aggregate filler comprises between about 26 – 61 percent by weight of the mortar composition and consequently the final composition of the filler aggregate must be such that the mortar possesses thermal properties, especially thermal expansion comparable to that of the cellular glass bodies being bonded. The siliceous filler may be substituted by coarsely ground cellular glass particles having a similar size distribution, i.e. substantially all the particles pass through a U.S. Standard #35 Screen. In addition, the thermal expansion of the mortar may be adjusted by complete or partial substitution of the coarse component by beta-spodumene or fused silica.

In the preferred practice of the present invention, the particulate components are selected in the proportion to provide the minimum sol demand to produce a trowelable mixture with less "weeping" of the mortar as encountered with conventional mortars having additives. By controlling the cellular glass particles to liquid sol ratio, the preferred concentration of the finely comminuted cellular glass particles is attained to provide a cementitious slurry for coating the surfaces of the cellular glass bodies and filling the interstices between the relatively coarse aggregate filler.

The most preferred mortar composition, according to the invention based upon 100 parts by weight of the particulate materials, includes finely comminuted cellular glass powder in the amount of about 36 parts wherein 99 percent of the particles pass through a U.S. Standard #325 Screen, coarse cellular glass particles in the amount of about 8 parts wherein 99 percent of the particles pass through a U.S. Standard #35 Screen, and round grained silica sand in the amount of about 56 parts wherein 99 percent of the particles pass through a U.S. Standard #35 Screen. The above components constitute the composition of the particulate material to which is added the colloidal silica solution LUDOX HS — 40 (described hereinabove) in the amount of about 20 parts by weight based upon the combined weights of the finely ground cellular glass powder, silica sand aggregate and coarse cellular glass particles.

The invention will be further understood and illustrated by reference to the following examples wherein all parts are by weight unless otherwise indicated.

EXAMPLE 1

In all cases, mortars of the present invention, like conventional mortars, are prepared by simple admixture of the components. For example, a mortar may be prepared by simply blending in a pot cellular glass powder, aggregate filler and silica sol. A coating of two commercially available silica mortars was applied to cellular silica blocks measuring 1⅜ inches × 2 7/16 inches × 8 13/16 inches. The cellular silica blocks were prepared as hereinabove described and had the composition 79.2% $SiO_2$; 18.4% $B_2O_3$; 2.4% $K_2O$. The mortar coatings were prepared in accordance with the manufacturer's recommendations, and one of the commercially available sodium silicate mortars with a silica sand filler was applied at a thickness of one eighth inch to the interface between blocks. The bonded array of blocks were dried at room temperature. After a 2½ to 4 month period maintained at room temperature, the bonded glass bodies were subjected to a three point flexural strength test. For monolithic (not mortared) glass blocks having a flexural strength between about 100 and 120 psi, the bonded glass bodies failed at about 74 percent of the flexural strength of monolithic blocks.

The foregoing procedure was repeated with the second commercially available silica sol mortar. Again, the mortar was prepared to the manufacturer's recommendations and applied to the interface between blocks. The mortared blocks were dried at room temperature, then slowly heated to 600° F, and allowed to cool to ambient temperature. The 600° F cycle was repeated, and the bond failed during the heating cycle. The mortar failed at the interface between the mortar and glass body after two cycles and, therefore, failed to demonstrate any percentage of the flexural strength of monolithic blocks.

The above procedure was repeated with a mortar comprising 30 percent finely ground glass powder formed from the cellular glass bodies wherein substantially all the particles passed through a U.S. Standard #325 Screen, 53.3 percent of an inert aggregate filler that comprises 46.7 percent round grained silica sand and 6.7 coarse cellular glass particles having a particle size wherein substantially all the particles passed through a U.S. Standard #20 Screen, and 16.7 percent of the colloidal silica solution LUDOX HS — 40 (described hereinabove). The constituents were made into a mortar by simple admixing thereof. Samples of cellular glass bodies formed of blocks bonded with this mortar were prepared as above and after a period of 2½ to 4 months at room temperature were subjected to the three point flexural strength test. Failure of the bonded glass bodies was noted at 89 percent of the flexural strength of monolithic blocks having a flexural strength between about 100 and 120 psi.

The above procedure was repeated with the same percentage amounts of finely ground glass powder, inert aggregate filler and colloidal silica solution. Samples of the cellular glass bodies bonded with this mortar were dried at room temperature and thereafter subjected to cyclic heating to 600° F. The temperature was slowly raised to 600° F and allowed to cool to room temperature. The 600° F cycle was again repeated. After two cycles of heating to 600° F, the bonded cellular glass bodies bearing mortar were subjected to the three point flexural strength test. The mortared glass bodies failed at 80 percent of the flexural strength of monolithic blocks. Thus, the mortar containing the finely ground cellular glass powder and inert aggregate filler having a composition as that of the cellular glass bodies being bonded and admixed with a colloidal silica solution demonstrated good mechanical strength and excellent resistance to thermal shock.

EXAMPLE 2

Cellular glass bodies as described in Example 1 were coated with mortars of the present invention. A mortar composition was prepared by admixing 48 percent finely ground glass powder formed from the cellular glass bodies of the example, wherein substantially all the glass powder had a particle size of U.S. Standard #325 Screen, 26 percent of a silica sand inert aggregate filler having a particle size wherein substantially all the particles passed through a U.S. Standard #20 Screen and 26 percent colloidal silica solution. The constituents were made into a mortar by simple admixing thereof and applied to the interface between the glass bodies. It was noted in the admixing of the mortar constituents that, by increasing the percentage of aggregate filler, i.e. sand, of the finely ground glass powder, the sol demand was lowered; but the mixture was difficult to trowel. On the other hand, it was noted, by increasing the percentage of the finely ground glass powder at the expense of filler, the sol demand was increased; and a tendency for mud cracking developed. Consequently, by controlling the ratio of glass powder to inert aggregate filler, a minimum sol demand can be obtained to yield a trowelable mortar that hardens within a reasonable time without the presence of a setting agent with less cracking and weeping of the mortar.

EXAMPLE 3

A mortar in accordance with the present invention was prepared by admixing 87 percent combined finely ground glass powder and inert aggregate filler comprising coarse cellular glass particles of the example and round grained silica sand with 13 percent LUDOX HS — 40 silica sol. The mixture of finely ground glass powder and an inert aggregate filler comprised 26 percent finely ground glass powder having a particle size of 99 percent passing through a U.S. Standard #35 Screen and 61 percent of round grained silica sand having a particle size of 99 percent passing through a U.S. Standard #35 Screen. The mortar was prepared by admixing the constituents, and the mortar was found to be readily trowelable and exhibited excellent acid resistance. The mortar was determined to have a thermal expansion between about $1.7 \times 10^{-6}/°F$ and $4 \times 10^{-6}/°F$ from $0°-500°F$ in comparison with the cellular glass bodies having a thermal expansion of $1.7 \times 10^{-6}/°F$. The wet density was found to be 132 pounds per cubic foot and the dried density, 118 pounds per cubic foot. Cellular borosilicate glass blocks were joined in an array with the above mortar and exhibited superior mechanical strength over a commercial silica sol mortar having a sodium silicate setting agent.

According to the provisions of the Patent Statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. An acid-resistant mortar composition for bonding cellular glass bodies consisting essentially of a mixture expressed by percentage weight of finely powdered reactive glass in the range between about 26 and 48 percent, said powdered reactive glass having substantially the same composition as said cellular glass bodies, inert aggregate filler in the range between about 26 and 61 percent, and a silica sol binder in the range between about 13 and 26 percent.

2. The acid-resistant mortar composition as set forth in claim 1 wherein the ratio of said finely ground cellular glass powder to said silica sol binder is about 1.8 to 1.

3. The acid-resistant mortar composition as set forth in claim 1 wherein said finely powdered reactive glass is selected from the group consisting of finely ground cellular glass powder, finely ground container glass powder, and finely ground glass cullet powder.

4. The acid-resistant mortar composition as set forth in claim 1 wherein said finely powdered reactive glass comprises finely comminuted borosilicate cellular glass having a particle size whereby substantially all particles pass through a U.S. Standard #325 Screen.

5. The acid-resistant mortar composition as set forth in claim 1 wherein said inert aggregate filler comprises relatively coarse particles of cellular glass having substantially the same composition as said cellular glass bodies with said coarse particles having a particle size whereby substantially all particles pass through a U.S. Standard #35 Screen and silica sand having a particle size whereby substantially all particles pass through a U.S. Standard #35 Screen.

6. The acid-resistant mortar composition as set forth in claim 5 wherein said coarse particles of cellular glass and said silica sand comprise more than 50 parts by weight based upon the combined weight of said finely ground cellular glass powder and said inert aggregate filler.

7. The acid-resistant mortar composition as set forth in claim 5 wherein said coarse particles of cellular glass comprise beta-spondumene and fused silica.

8. The acid-resistant mortar composition as set forth in claim 5 wherein said coarse particles of cellular glass comprise about 7 percent by weight of said mortar composition.

9. The acid-resistant mortar composition as set forth in claim 5 wherein said silica sand comprises about 46 percent by weight of said mortar composition.

10. The acid-resistant mortar composition as set forth in claim 1 wherein said silica sol binder comprises about 20 parts by weight of said mortar composition.

11. The acid-resistant mortar composition as set forth in claim 1 wherein said finely ground cellular glass powder comprises particles having an average diameter between about 3 and 5 micrometers.

12. The acid-resistant mortar composition as set forth in claim 1 wherein said cellular glass bodies bonded by said mortar composition and dried at room temperature have a flexural strength of about 89 percent of the flexural strength of monolithic cellular glass bodies.

13. The acid-resistant mortar composition as set forth in claim 1 wherein said mortar composition has a thermal expansion between about $1.7 \times 10^{-6}/°F$ and $4 \times 10^{-6}/°F$ from $0°-500°F$.

* * * * *